US006842695B1

United States Patent
Tu (10) Patent No.: US 6,842,695 B1
(45) Date of Patent: Jan. 11, 2005

(54) MAPPING AND ADDRESSING SYSTEM FOR A SECURE REMOTE ACCESS SYSTEM

(75) Inventor: Edgar Allan Tu, Castro Valley, CA (US)

(73) Assignee: fusionOne, Inc., San Jose, CA (US)

( * ) Notice: Subject to any disclaimer, the term of this patent is extended or adjusted under 35 U.S.C. 154(b) by 0 days.

(21) Appl. No.: 09/837,619

(22) Filed: Apr. 17, 2001

(51) Int. Cl.[7] .......................... G06F 11/30; H04L 9/00
(52) U.S. Cl. .................. 701/213; 701/201; 701/209; 455/456.2; 713/200
(58) Field of Search ................ 701/213, 201, 701/208, 209; 709/201, 217, 219; 707/10, 104, 104.1; 713/200, 201, 182; 455/456.1, 456.2, 456.5, 456.6, 456; 342/357.1, 357.13, 357.17

(56) References Cited

U.S. PATENT DOCUMENTS

| 5,485,161 | A | * | 1/1996 | Vaughn .................. 342/357.13 |
| 5,543,789 | A | * | 8/1996 | Behr et al. .................. 340/995 |
| 5,544,061 | A | * | 8/1996 | Morimoto et al. .......... 340/995 |
| 5,699,255 | A | * | 12/1997 | Ellis et al. ................... 701/212 |
| 5,946,615 | A | * | 8/1999 | Holmes et al. ............. 455/412 |
| 5,961,572 | A | * | 10/1999 | Craport et al. .............. 340/990 |
| 5,987,381 | A | * | 11/1999 | Oshizawa ................... 340/990 |
| 6,094,618 | A | * | 7/2000 | Harada ........................ 701/207 |
| 6,141,621 | A | * | 10/2000 | Piwowarski et al. ........ 340/989 |
| 6,148,260 | A | * | 11/2000 | Musk et al. ................ 701/200 |
| 6,252,547 | B1 | * | 6/2001 | Perry et al. ............ 342/357.06 |
| 6,255,989 | B1 | * | 7/2001 | Munson et al. ........ 342/357.13 |
| 6,278,941 | B1 | * | 8/2001 | Yokoyama ................... 701/209 |
| 6,292,743 | B1 | * | 9/2001 | Pu et al. ...................... 455/456 |
| 6,295,502 | B1 | * | 9/2001 | Hancock et al. ............ 701/201 |
| 6,324,467 | B1 | * | 11/2001 | Machii et al. .............. 701/200 |
| 6,327,533 | B1 | * | 12/2001 | Chou ........................ 340/988 |
| 6,343,290 | B1 | * | 1/2002 | Cossins et al. ............... 707/10 |

* cited by examiner

Primary Examiner—Tan Q. Nguyen
(74) Attorney, Agent, or Firm—Vierra Magen Marcus Harmon & DeNiro LLP (57) ABSTRACT

A mapping and addressing system suitable for use with secure remote access system, and in particular, with open application (web browsing) standard remote access devices is disclosed. The invention provides an open application standard for GPS support, and provides access to remote address data otherwise previously unavailable to conventional GPS systems.

42 Claims, 5 Drawing Sheets

MAPPING AND ADDRESSING SYSTEM FOR A SECURE REMOTE ACCESS SYSTEM

BACKGROUND OF THE INVENTION

1. Field of the Invention

This invention pertains generally to global positioning systems. More particularly, the invention is a mapping and addressing system suitable for use with secure remote access systems, and in particular, with remote access devices capable of browsing web pages.

2. The Prior Art

Global position systems (GPS) are known for providing location and tracking information to users of such systems. For example, some automobile manufacturers have equipped their vehicles with proprietary GPS devices fixed to the vehicle's dashboard or instrument panel to provide the vehicle occupants with such geographical data as the physical location and street address of the vehicle.

The need for such geographical data (i.e., locational and directional data) is readily apparent in other scenarios where the user is mobile including, for example, where the user is accessing public transportation systems. To meet this demand, handheld devices have been developed to provide the user with the same geographical data provided by legacy GPS systems. For example, the personal digital assistant (PDA) developed by Handspring™ is configured to receive an add-in GPS module (Geode by GeoDiscovery™) which the user can use to provide similar travel guide data as conventional GPS systems.

Solutions have also been developed for notebook and other portable computers. These solutions provide GPS hardware and software installable on the portable computer and provide conventional GPS geographical data as other systems.

A common disadvantage to prior art GPS solutions, whether fixed in a vehicle or mobile (such as PDAs and notebook computers) is the need for proprietary hardware and/or software. Prior art GPS solutions will not generally function across multiple platforms and operating systems. For example, the GPS system designed for vehicles will not generally operate on a PDA or notebook computer. Conversely, PDS GPS solutions will not generally operation on vehicle GPS systems.

Another disadvantage present with prior art GPS solutions is the common requirement to provide both source and destination addresses when obtaining driving directions. This problem is reduced where the user has such information locally stored on the GPS device, such as, when the GPS device is a PDA and the requisite addresses are stored on the PDA's address book, for example. However, in many cases the required address may be located on another machine, remote for the actual GPS device. In these cases, the use may be required to manually enter the address sought or otherwise obtain the address remotely.

Accordingly, there is a need for a mapping and addressing system suitable for use with secure remote access systems, and in particular, with remote access devices capable of browsing web pages, to thereby provide an open application standard for GPS support and to further provide access to remote address data otherwise previously unavailable. The present invention satisfies these needs, as well as others, and generally overcomes the deficiencies found in the background art.

BRIEF DESCRIPTION OF THE INVENTION

The present invention is a mapping and addressing system suitable for use with secure remote access systems, and in particular, with remote access devices capable of browsing web pages. The invention provides wide support for a plurality of remote access device types capable of browsing web pages, including for example, computers, mobile telephones, and other conventional internet appliances.

The invention is generally embodied in a "map response subsystem" (MRS) software application operating as or in conjunction with a secure remote access system. Copending application entitled METHOD AND APPARATUS FOR A SECURE REMOTE ACCESS SYSTEM, filed Jul. 19, 2000, describes a method and system for remote and secure access to a host computer, and which further provides an open application standard for client access to a host (base) device, the application of which is incorporated herein by reference. In this co-pending application, a plurality of user server modules are provided to manage communication between the remote access device and the base device. The remote access device provides an open standard application such as a web browser for viewing data and issuing commands. The user server modules communicate with the base device to provide information from the base device to a user of the remote access device.

The MRS of the present invention may be used in conjunction with such a remote access system to provide the functions described herein. In general, the MRS provides locational data as well as driving direction data to users of remote access devices.

According to one illustrative embodiment, the MRS comprises a request handler operatively coupled for communication to a GPS bridging system, and a mapping system operatively coupled for communication to the request handler. The request handler provides an interface between the MRS and requesting systems. The interface handler receives requests which are delegated to the GPS bridging system and the mapping system.

The GPS bridging system is configured to covert longitude and latitude data into street data. Typically, GPS data provided by remote access devices are in the form of latitude and longitude data. However, such information is not normally useful to the ordinary user. Accordingly, the MRS provides means for providing street address and other mapping data from longitude and latitude data provided by the remote access device. Furthermore, driving directions are normally more informative when provided in the form of street and address data, rather than longitude and latitude data. For this additional reason, support is provided to convert from longitude and latitude data into street and address data.

The mapping system is configured to provide graphical representations of street address data, in addition to the textual representation of the street address data. The mapping system is further configured to map driving directions from a source location to a destination location.

The MRS when operating in conjunction with a remote access system provides access to data resident on a base device. Under this arrangement the user is able to obtain location and driving directions for data resident on a base device. For example, the base device may be a user's home computer. Under this scenario, a user accessing a conventional remote access device, such as a cell phone, is able to obtain location and driving directions, not only for locations which the user may input, but for locations resident on the home computer, such as the addresses located on the user's address book stored on the home computer.

The invention further relates to machine readable media on which are stored embodiments of the present invention.

It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

An object of the invention is to provide a mapping and addressing system which overcomes the deficiencies in the prior art.

Another object of the invention is to provide a mapping and addressing system which provides open application support to remote access devices having web browsing means.

Yet another object of the invention is to provide a mapping and addressing system which provides access to information resident in a base device.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
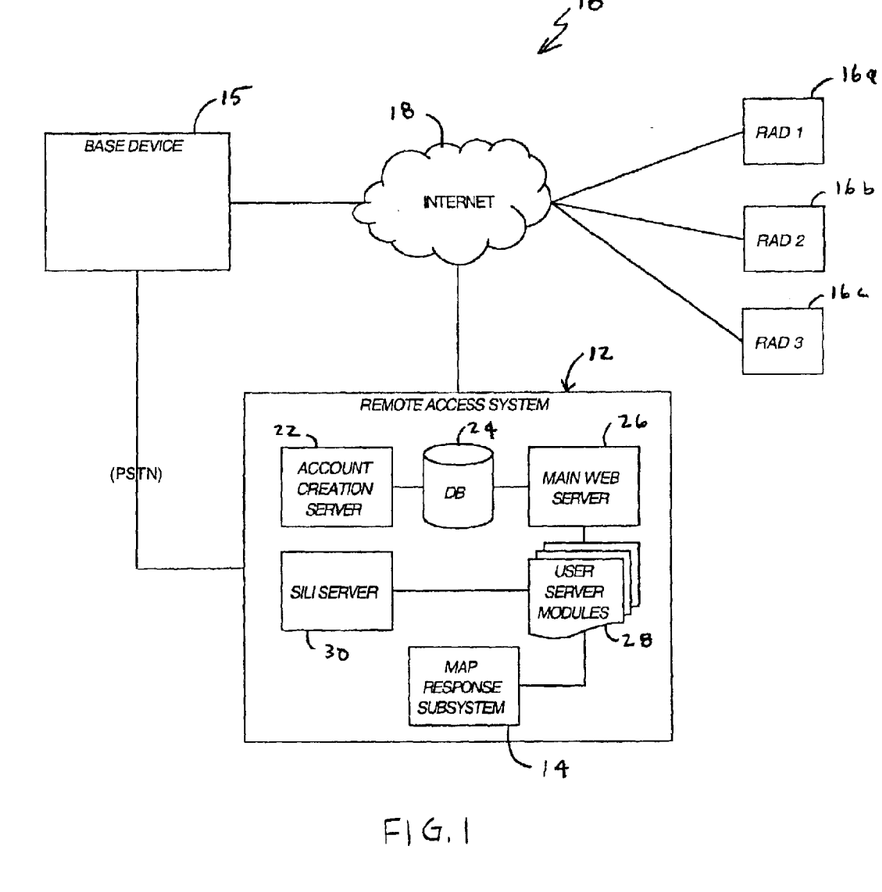
FIG. 1 is a functional block diagram depicting an illustrative mapping and addressing system in accordance with the present invention.
Figure 2:
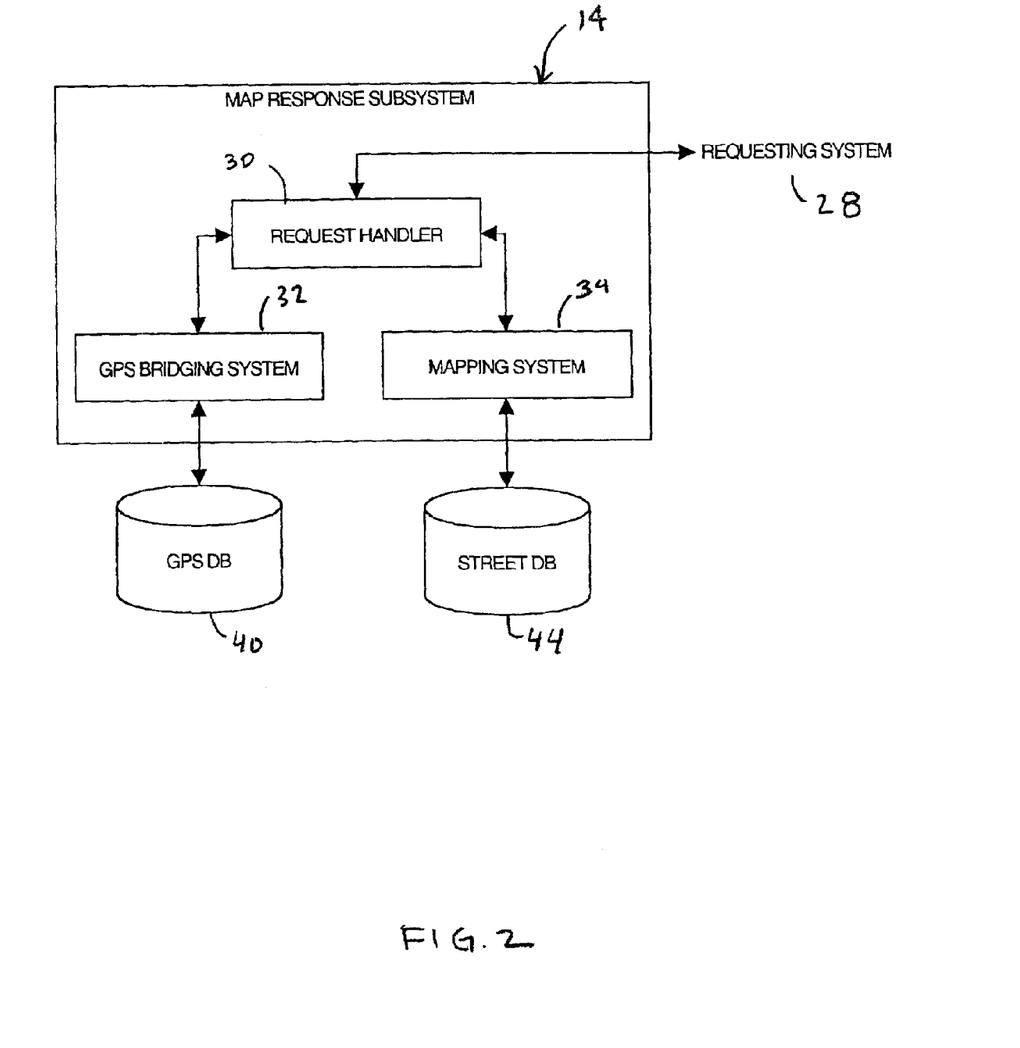
FIG. 2 is a function block diagram depicting an illustrative map response subsystem in accordance with the present invention.
Figure 3:
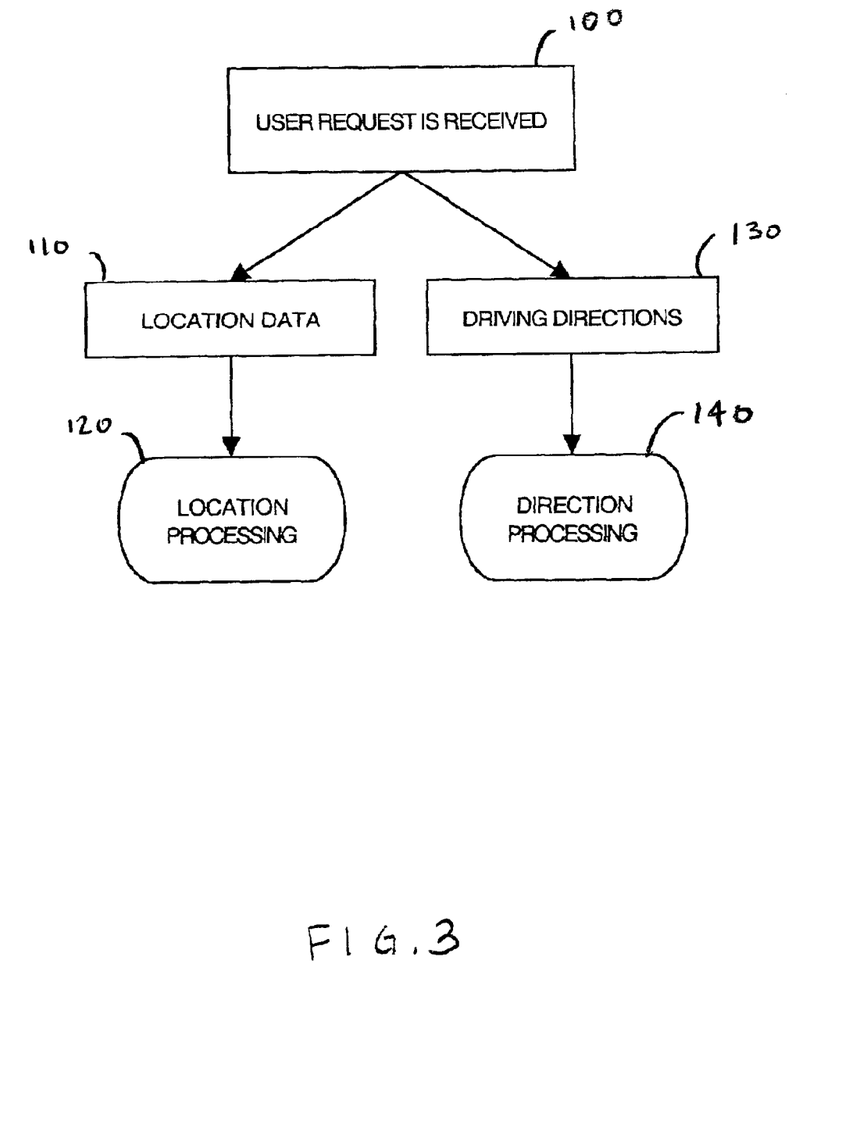
FIG. 3 is a logical flow diagram depicting the general process associated with the mapping and addressing system in accordance with the present invention.
Figure 4:
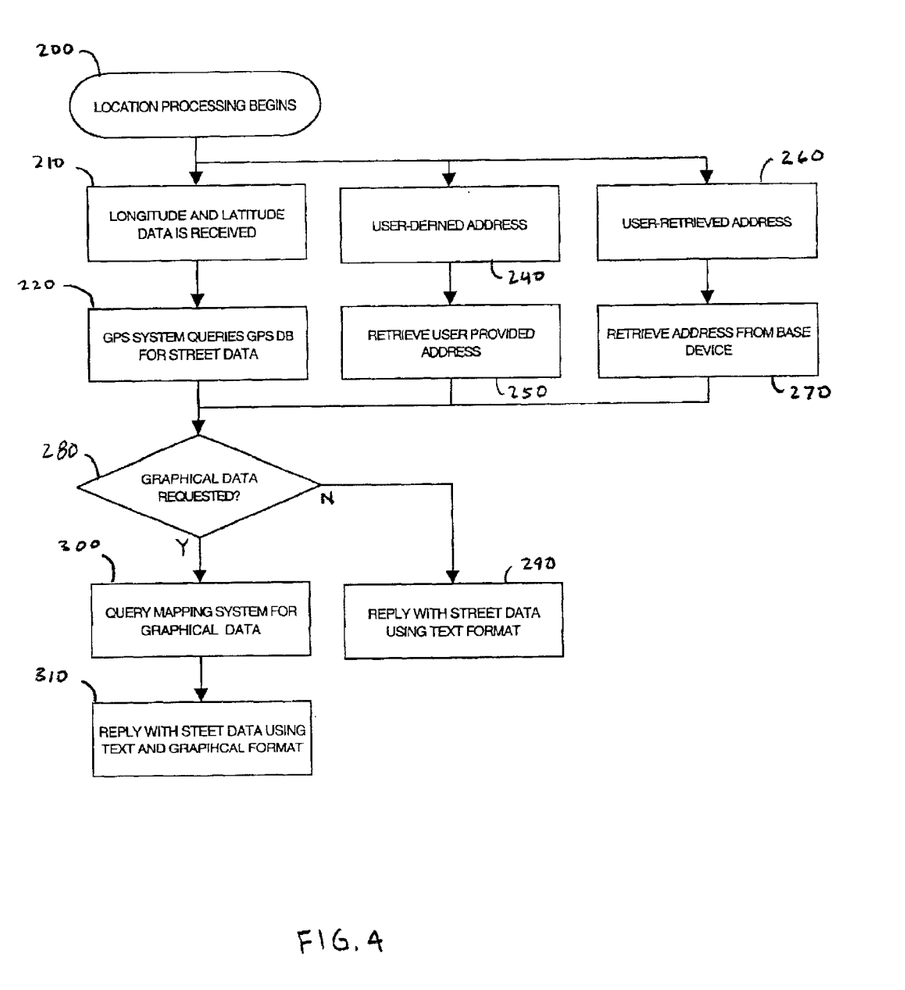
FIG. 4 is a logical flow diagram depicting the general process associated with location processing in accordance with the present invention.

Referring more specifically to the drawings, for illustrative purposes the present invention is embodied in the apparatus shown FIG. 1 and FIG. 2 and the method outlined in FIG. 3 through FIG. 4. It will be appreciated that the apparatus may vary as to configuration and as to details of the parts, and that the method may vary as to details and the order of the acts, without departing from the basic concepts as disclosed herein. The invention is disclosed generally in terms of mapping and address system, although numerous other uses for the invention will suggest themselves to persons of ordinary skill in the art.

Referring first to FIG. 1, there is a shown a block diagram of a mapping and addressing system 10 including a remote access system 12 and the map response subsystem (MRS) of the present invention 14 operating within the remote access system 12. The MRS 14 is described more fully below in conjunction with FIG. 2 through FIG. 5. In general, the MRS 14 is embodied in software executed by a server device (or server farm) and carries out the operation described herein.

The remote access system 12 is operatively coupled for communication with a base device 15, normally via the Internet 18. The base device 15 may be a home computer to which a remote user is connecting remotely. As another example, the base device 15 may be a network of computers (such as a corporate LAN (local area network) to which a remote is user is connecting remotely. It will be readily apparent to those skilled in the art having the benefit of this disclosure that other data processing means may further be configured as base device 15 including for example, a personal digital assistance (such as a Windows CE™ palmtop) or a laptop or notebook computer.

The system 10 further includes one or more remote access devices (RAD 1 (16a) through RAD 3 (16c)) which may be configured to be connected to the remote access system 12 via the Internet 18. RADs 16a through 16c may be any data processing means suitable for executing a web browser and connecting to the Internet 18. For example, a conventional computer, a laptop computer, a mobile telephone, a personal digital assistant (PDA), or other Internet appliance (such as Web TV™) may be used as the RAD of the invention.

The remote access system 12 carries out the operation of providing an open application standard for remote access for users of the RAD (16a through 16c). As described more fully in co-pending application entitled METHOD AND APPARATUS FOR A SECURE REMOTE ACCESS SYSTEM, filed Jul. 19, 2000, the remote access system describes the method and system for remote and secure access from the remote access devices to a base device. The present invention preferably uses this method for retrieving address data from the base device.

In general, remote access system 12 includes an account creation server 22 coupled to a database (DB) 24 which is further coupled to a main web server 26. A plurality of user server modules 28 is also coupled to the main web server and to a sili server 30. As noted above, account creation server 22, database (DB) 24, main web server 26, user server modules 28 and sili server 30 are described more fully in co-pending application entitled METHOD AND APPARATUS FOR A SECURE REMOTE ACCESS SYSTEM.

The MRS 14 is further coupled to the user server modules to provide the locational and directional functions described herein. Referring now to FIG. 2, as well as FIG. 1, there is shown a function block diagram depicting an illustrative MRS 14 in accordance with the present invention. As described above, MRS 14 is normally embodied is software operating on a server device (or server farm) or other conventional data processing means suitable of executing the MRS 14.

MRS 14 comprises a request handler 30, a GPS bridging system 32 operatively coupled for communication to the request handler 30, and a mapping system 34 operatively coupled for communication to the request handler 30.

The request handler 30 is also coupled for communication to one or more requesting systems (normally user server modules 28). The request handler 30 is configured to receive request from the requesting systems and allocate tasks to the GPS bridging system 32 and the mapping system 34. Completed tasks are then communicated to the requesting system in response to the request. When the request handler 30 receives a request from a requesting system to provide addressing information from longitude and latitude data, the request handler 30 assigns the request to the GPS bridging system 32 for further processing. When the request handler 30 receives mapping or driving direction requests, the request handler 30 assigns the request to the mapping system 34 for further processing.

The GPS bridging system 32 receives requests from the request handler 30 to translate longitude and latitude data into street address data (i.e., textual locational data). As depicted in FIG. 2, the GPS bridging system 32 is further coupled to a GPS database (DB) 40. DB 40 comprises a conventional data storage facility for storage and retrieval of data. In the present example, DB 40 includes a data mapping from longitude and latitude coordinates into street address. The data mapping in DB 40 may be generated by correlating longitude and latitude data from conventional maps into street and block addresses, as is known in the art. The correlation from longitude and latitude data to street and block address are then defined within a relational table scheme in DB 40. It is noted that other data structures for correlating from longitude and latitude data to street and block address may also be used with the invention. Under this arrangement, the GPS bridging system 32 queries the DB 40 for the street address for the given longitude and latitude data. The returned street address is then returned to the request handler 30 for further processing.

Conversion from longitude and latitude data to street and block address is provided to support remote access devices which are only able to obtain its longitude and latitude coordinates. Accordingly, the present invention is able to provide street-level locational data to remote access devices having conventional web browsing means from longitude and latitude coordinates.

The mapping system 34 receives requests from the request handler 30 to provide graphical mappings of street locations (i.e., graphical locational data) as well as driving directions given source and destination street locations (i.e., directional data). The mapping system 34 is further coupled to a street database (DB) 44. DB 44 comprises a conventional data storage facility for storage and retrieval of data. In the present example, DB 44 contains mapping data for graphical representations of street-level addresses. Such databases are readily available as commercial products and may be integrated with the present system. Accordingly, when the mapping system 34 receives from the request handler 30 a map request for a given street address, the mapping system 34 queries DB 44 for the corresponding graphical map data. This graphical map data is then provided as a reply to the request handler 30 for further processing.

The mapping system 34 is also configured to provide driving directions from a source address to a destination address upon request from the request handler 30. The mapping system 34 may typically uses a conventional mapping algorithm (such as Mapquest™) to carry out this process. The mapping system is further configured to provide a graphical format of the driving, in addition to textual format. The graphical format for driving directions may be generated in the form of maps, similar to the process carried out above in generating graphical map data.

The street addresses used in the processes described above in conjunction with the mapping system 34 may be provided either from the user (accessing a remote access device) or from the base device (associated with the user). A user provides the address data by either entering the street address directly or by providing longitude an latitude coordinates which are then converted to a street address. The base device 15 provide the address data when the user requests the remote access system 12 to obtain the address information from the base device 15. Accordingly mapping and addressing system 10 provides for an open application (web standard) for supporting locational and directional data requests in conjunction with support for remote access to address information on the base device 15.

Users generally access system 10 via a RAD (16a through 16c). Using the browsing means on the RAD, the user connects to the system 12 via a conventional Internet connection 18. Upon connection to the system 12, the user is authenticated, and proceeds with requesting locational and direction data as described herein. As would be readily apparent to those skilled in the art having the benefit of this disclosure, the system 12 and the RAD communicate using conventional Internet protocols (such as http (hypertext transfer protocol) or https (secure http)).

The invention provides a second secure channel between the user server module and the base device using a private protocol. To provide additional security, the invention provides that data communications between the user server module and the base device be initiated by the base device, rather than the server module. The details for carrying out communication transactions with the base device is described more fully below. In general, the base device initiates a request to the user server module which opens a communication socket between the base device and the user server module. In particular, the communication socket permits the base device and the user server module to communicate through a firewall. Once this communication socket is open, the server module is able to issue commands to the base device. In response, the base device then executes the command.

The base devices typically connect to the Internet using conventional connection means, such as dial-up, cable, or network connections, for example. Each base device contains or provides an access gateway to information which is provided to the user of the remote access device. Such information may include, for example, computer files such as address book files, document files, email documents, among others. Each base device is identified with a user of the remote access device via conventional authentication means, such as challenge and response authentication. For example, when a remote user provides a user name and password to the system 10, the system 10 then identifies the base device which the user is entitled to access.

The base devices may be any conventional data processing means or computer suitable for communicating data to the user server modules 28 in accordance with the present invention. The "base" device and its operation is described in copending application entitled "AGENT SYSTEM FOR A SECURE REMOTE ACCESS SYSTEM" filed Jul. 19, 2000, the disclosure of which is expressly incorporated herein by reference.

In cases where a base device does not have a permanent (i.e., persistent or "full-time") connection to the Internet, the Sili server 30 is configured to "wake up" the base device. Normally, this process is carried out when a user identified with the base devices is accessing the system 10 via a remote access device. Accordingly, the system 10 may-be further coupled to the base devices via the Sili server 30. The Sili server 30 is coupled to a modem pool which may comprise a bank or pool of modems as is known in the art. The Sili server 30 is configured to dial the base device by calling a phone number designated for the base device via PSTN (public switched telephone network) and negotiate a connection between the base device and Sili server via the Internet. During negotiation, the Sili server 30 typically identifies the identity (or location such as the IP address) of the Sili server 30, and then terminates the PSTN connection. In response, the base device then carries out the operation of connecting to the Internet and communicating with the Sili server 30 over the Internet connection. Once connected with the Sili server 30 via the Internet (whether permanently or as requested during the above described "wake up" process), the Sili server 30 then communicate which user server module is requesting data from the base device.

Preferably, communications between the base device and the Sili server 30 are initiated by the base device. For example, a base device which maintains a full time Internet connection is generally configured to periodically communicate "job request" commands at a predetermined interval (e.g., forty (40) seconds) to the Sili server 30. In response, the Sili server 30 may indicate "no job" or "job request by a user server module". "No job" is communicated where the user associated with the base device is not requesting data at this time. "Job request by a user sever module" is communicated when the user associated by the base device is requesting data. Where the Sili server 30 indicates that a job request is pending, the Sili server 30 also identifies the particular user server module 28, normally by identifying the IP address of the particular user server module.

If the base device does not maintain a full-time Internet connection, further processing may be required to establish a communication between the Sili server 30 and the base device over the Internet. The Sili server 30 may readily determine whether a particular base device maintains a full time Internet connection by checking whether the base device communicates period "job request" commands as described above. Where the base device does not maintain a full-time connection to the Internet, the invention provides means for signaling the base device to establish an Internet connection and connect to the Sili server 30.

As described above, communication sequences between the system 10 (Sili server 30 and user server module 28) and the base device is generally initiated by the base device, rather than the system 10. However, for data transfers and key operations (such as file transaction), communications are initiated by the remote device. This arrangement provides several advantages which overcomes problems associated with the prior art. First, security is increased since the data communications are initiated by the base device rather than by the system 10. By requiring the base device to initiate communication (and therefore establish a connection socket), hacking into the base device from the outside becomes a more difficult task. Additionally, the invention may be practiced even if the base device is behind firewall because the base device initiates communication and opens the connection to the agent communication module, thereby allowing reply communications and task commands to be communicated from the agent communication module.

The communications between the base device and the system 10 are preferably carried out over a secure connection utilizing for example, 128-bit encryption. Additionally, a private (non-public) communication may be provided by the system as a communication means between the system 10 and the base device as is known in the art.

Figure 5:
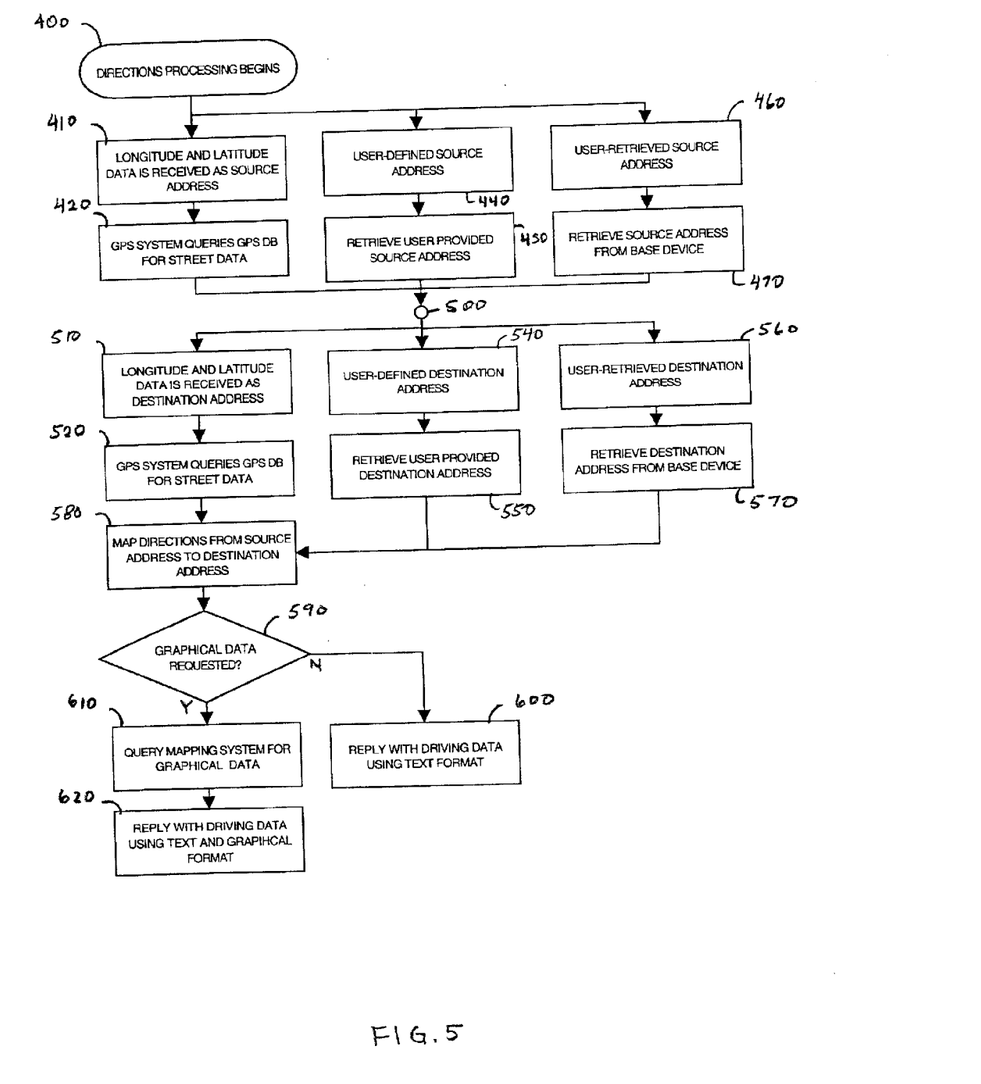
FIG. 5 is a logical flow diagram depicting the general process associated with the directions processing in accordance with the present invention.

The method and operation of invention will be more fully understood with reference to the logical flow diagrams of FIG. 3 through FIG. 5, as well as FIG. 1 and FIG. 2. FIG. 3 is a logical flow diagram depicting the general process associated with the mapping and addressing system in accordance with the present invention. FIG. 4 is a logical flow diagram depicting the general process associated with location processing in accordance with the present invention.

FIG. 5 is a logical flow diagram depicting the general process associated with the directions processing in accordance with the present invention. The order of actions as shown in FIG. 3 through FIG. 5 and described below is only exemplary, and should not be considered limiting.

Referring now to FIG. 3, as well as FIG. 1 and FIG. 2, there is shown a logical flow diagram depicting the general process associated with the mapping and addressing system 10 in accordance with the present invention.

At box 100, a user request is received by the remote access system 12. This request is received from on of the RAD devices accessed by the user.

As shown in FIG. 3, the request may be for locational data (box 100), such as street address information or mapping information. As described further below, this address information may be longitude and latitude data, user-defined data, or data retrieved ("user-retrieved") from the base device 15. In this case, processing continues with process 120.

Alternatively, the request may be for driving directions (directional data, designated box 130). In this case the user is requesting for street and/or mapping directions from a source location to destination location. As described further below, this address (source and destination) information may be longitude and latitude data, user-defined data, or data retrieved ("user-retrieved") from the base device 15. Where the user requests is for driving directions, processing continues with process 140.

Process 120 specifies the acts associated with retrieving locational data and is described more fully below in conjunction with FIG. 4. Process 140 specifies the acts associated with retrieving directional data and is described more fully below in conjunction with FIG. 5.

Referring next to FIG. 4, as well as FIG. 1 through FIG. 3, there is shown a logical flow diagram depicting the general process associated with location processing in accordance with the present invention. This process is carried out during process 120 of FIG. 3.

At process 200, the location processing begins in response to a locational request received from the user of a RAD. Processing continues according to the request command received from the user. Where the user provides longitude and latitude data, processing continues with box 210. This scenario takes place when, for example, the user is accessing a mobile phone which provides longitude and latitude data. Where the user provides a user-defined address, processing continues with box 240. For example, the user may want to generate a mapping diagram for a specific known address. Where the user requests an address from the user's associated base device 15, processing continues with box 260. This scenario may arise when, for example, the user is requesting locational (street address or mapping) data for an address resident on the user's home computer.

At box 210, the user is providing longitude and latitude coordinates to determine street address information. The longitude and latitude data is received by the request handler 30 and communicated to the GPS bridging system for further processing. Box 220 is then carried out.

At box 220, the GPS bridging system queries DB 40 to obtain the street address corresponding to the provided longitude and latitude data. This street address data is then provided to the request handler 30. Diamond 280 is then carried out.

At box 240, the requested address received from the user is "user-defined" or otherwise specifically provided by the user of the RAD. For example, the user may specifically provide a known street address location. Box 250 is then carried out.

At box 250, the request handler receives the user-defined address. Diamond 280 is then carried out.

At box 260, the request received from the user is for a "user-retrieved" address which is retrievable (available) from the base device 15. Box 270 is then carried out.

At box 270, the designated user module (28) of the system 12 communicates with the base device 15 to obtain the requested address as designated by the user. Copending application entitled METHOD AND APPARATUS FOR A SECURE REMOTE ACCESS SYSTEM, filed Jul. 19, 2000, describes a method and system for remote and secure access to the base device for retrieval of such information as address book entries. The requested address is then communicated to the MRS 14 for processing. Diamond 280 is then carried out.

At diamond 280, the requested street address has been determined. The requested handler 30 then determines from the user request (box 100 of FIG. 3) whether the user is requesting graphical data in addition to the actual street address information. If so, box 300 is carried out. Otherwise box 290 is then carried out.

At box 290, the address location requested is communicated by the request handler 30 using conventional text formatting. In general, this data is communicated form the MRS 14 to the requesting server module 28 for communication to the appropriate RAD for viewing by the user thereon.

At box 300, the request handler 30 designates the mapping system 34 to retrieve the graphical mapping information related to the requested address location. In response, the mapping system 34 queries the DB 44 for the requisite mapping data and provides the request handler 30 with the retrieved mapping information. Box 310 is then carried out.

At box 310, the address information requested is communicated by the request handler 30 using conventional text formatting and graphical formatting suitable for viewing on the RAD.

Referring now to FIG. 5, as well as FIG. 1 through FIG. 4, there is shown a logical flow diagram depicting the general process associated with the directions processing (i.e., obtaining driving directions form a source location to a destination location) in accordance with the present invention. This process is carried out during process 140 of FIG. 3.

At process 400, the directions processing begins in response to a driving directions request received form the user of a RAD. Processing continues according to the request command received from the user. Where the user provides, as the source address, longitude and latitude data, processing continues with box 410. This scenario takes place when, for example, the user want to determine driving directions from the location of the RAD to another destination location. Where the user provides a user-defined address, processing continues with box 440. For example, the user may want to generate driving directions from a specific known address. Where the user requests an address from the user's associated base device 15, processing continues with box 460. This scenario may arise when, for example, the user is requesting driving directions from an address resident on the user's home computer.

At box 410, the user is providing longitude and latitude coordinates for the source address. The longitude and latitude data is received by the request handler 30 and communicated to the GPS bridging system for further processing. Box 420 is then carried out.

At box 420, the GPS bridging system queries DB 40 to obtain the street address corresponding to the provided longitude and latitude data. This street address data is then provided to the request handler 30. Processing then continues at junction 500.

At box 440, the requested address received from the user is "user-defined" or otherwise specifically provided by the user of the RAD. Box 450 is then carried out.

At box 450, the request handler receives the user-defined address. Processing then continues at junction 500.

At box 460, the request received from the user is for a "user-retrieved" address which is retrievable from the base device 15. Box 470 is then carried out.

At box 470, the designated user module (28) of the system 12 communicates with the base device 15 to obtain the requested address as designated by the user. The requested address is then communicated to the MRS 14 for processing. Processing then continues at junction 500.

At junction 500, processing for the destination address is carried out. As with the source address, the destination address may be determined from longitude and latitude data (box 510 and box 520), may be user-defined (box 540 and box 550), or may be user-retrieved (box 560 and box 570). The processing for the destination address is carried out in substantially the same manner for as the source address described above.

At box 510, the user is providing longitude and latitude coordinates for the destination address. The longitude and latitude data is received by the request handler 30 and communicated to the GPS bridging system for further processing. Box 520 is then carried out At box 520, the GPS bridging system queries DB 40 to obtain the street address corresponding to the provided longitude and latitude data. This street address data is then provided to the request handler 30. Processing then continues with box 580.

At box 540, the requested destination address received from the user is "user-defined" or otherwise specifically provided by the user of the RAD. Box 550 is then carried out.

At box 550, the request handler receives the user-defined destination address. Processing then continues with box 580.

At box 560, the request received from the user is for a "user-retrieved" address which is retrievable from the base device 15. Box 570 is then carried out.

At box 570, the designated user module (28) of the system 12 communicates with the base device 15 to obtain the requested address as designated by the user. The requested address is then communicated to the MRS 14 for processing. Processing then continues with box 580.

At box 580, the request handler 30 issues a request to the mapping system 34 to determine driving directions from the source address location to the destination address location. The mapping system 34 receives this request and generates driving directions, as described above. In general, such driving directions may include conventional "door-to-door" directions, including street, highway, point of interests, and other direction data. The generated driving directions are then provided to the request handler 30. Diamond 590 is then carried out.

At diamond 590, the requested driving directoins has been determined. The requested handler 30 then determines from the user request (box 100 of FIG. 3) whether the user is requesting graphical (map) data in addition to the actual street address driving data information. If so, box 610 is carried out. Otherwise box 600 is then carried out.

At box 600, the driving directions requested is communicated by the request handler 30 using conventional text formatting. In general, this data is communicated form the MRS 14 to the requesting server module 28 for communication to the appropriate RAD for viewing by the user thereon.

At box 610, the request handler 30 designates the mapping system 34 to retrieve the graphical mapping information related to the requested driving directions data. In response, the mapping system 34 queries the DB 44 for the requisite mapping data and provides the request handler 30 with the retrieved mapping information. Box 620 is then carried out.

At box 620, the driving directions requested is communicated by the request handler 30 using conventional text formatting and graphical formatting suitable for viewing on the RAD.

Accordingly, it will be seen that this invention provides a mapping and addressing system suitable for use with secure remote access systems, and in particular, with open application (web browsing) standard remote access devices, which provides an open application standard for GPS support, which further provides access to remote address data otherwise previously unavailable to conventional GPS systems. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for servicing requests generated by an individual for geographic information, said method comprising the steps of:
   (a) receiving a request at a remote access server from a remote access device, wherein:
   said request calls for geographic information,
   said request calls for said remote access server to obtain data from a base device owned, operated and/or controlled by the individual, and
   said base device is operatively coupled for communication with said remote access server via a network;
   (b) said remote access server obtaining said data from said base device; and
   (c) providing said geographic information called for in said request, based at least in part on said data.

2. A method according to claim 1, wherein said geographic information is location data.

3. A method according to claim 2, wherein said step (c) includes the step of:
   (1) querying a mapping system for graphical data.

4. A method according to claim 3, wherein said query is based at least in part on said data obtained in said step (b).

5. A method according to claim 4, wherein said data obtained in said step (b) identifies a geographic location.

6. A method according to claim 5, wherein said graphical data includes a map showing said geographic location.

7. A method according to claim 1, wherein said geographic information is direction data.

8. A method according to claim 7, wherein said data obtained in said step (b) identifies at least a first location.

9. A method according to claim 8, wherein said geographic information includes directions between said first location and a second location.

10. A method according to claim 9, wherein said data obtained in said step (b) identifies said second location.

11. A method according to claim 8, wherein said step (c) includes the step of:
    (1) querying a mapping system for graphical data, based at least in part on said first location.

12. A method according to claim 11, wherein said graphical data includes a map showing directions between said first location and a second location.

13. A method according to claim 12, wherein said step (c) includes the step of:
    (2) mapping directions between said first location and said second location.

14. A method according to claim 1, wherein said remote access server obtains said data from said base device in said step (b) via a secure link in said network.

15. A method according to claim 1, wherein said remote access server obtains said data from said base device in said step (b) via at least one request initiated by said base device.

16. A method according to claim 1, wherein said data includes information other than a geographic location of said base device.

17. A computer readable medium having computer readable code embodied on said computer readable medium, said computer readable code for programming said computer to perform a method for servicing requests generated by an individual for geographic information, said method comprising the steps of:
    (a) receiving a request at a remote access server from a remote access device, wherein:
    said request calls for geographic information,
    said request calls for said remote access server to obtain data from a base device owned, operated and/or controlled by the individual, and
    said base device is operatively coupled for communication with said remote access server via a network;
    (b) said remote access server obtaining said data from said base device; and
    (c) providing said geographic information called for in said request, based at least in part on said data.

18. A computer readable medium according to claim 17, wherein said geographic information is location data.

19. A computer readable medium according to claim 18, wherein said step (c) includes the step of:
    (1) querying a mapping system for graphical data.

20. A computer readable medium according to claim 19, wherein said query is based at least in part on said data obtained in said step (b).

21. A computer readable medium according to claim 20, wherein said data obtained in said step (b) identifies a geographic location.

22. A computer readable medium according to claim 21, wherein said graphical data includes a map showing said geographic location.

23. A computer readable medium according to claim 17, wherein said geographic information is direction data.

24. A computer readable medium according to claim 23, wherein said data obtained in said step (b) identifies at least a first location.

25. A computer readable medium according to claim 24, wherein said geographic information includes directions between said first location and a second location.

26. A computer readable medium according to claim 24, wherein said step (c) includes the step of:

(1) querying a mapping system for graphical data, based at least in part on said first location.

27. A computer readable medium according to claim 26, wherein said graphical data includes a map showing directions between said first location and a second location.

28. A computer readable medium according to claim 27, wherein said step (c) includes the step of:

(2) mapping directions between said first location and said second location.

29. A computer readable medium according to claim 17, wherein said remote access server obtains said data from said base device in said step (b) via a secure link in said network.

30. A computer readable medium according to claim 17, wherein said remote access server obtains said data from said base device in said step (b) via at least one request initiated by said base device.

31. A computer readable medium according to claim 17, wherein said data includes information other than a geographic location of said base device.

32. An apparatus comprising:

at least one storage medium; and at least one processor in communication with said at least one storage medium, said at least one processor performs a method for servicing requests generated by an individual for geographic information, said method comprising the steps of:

(a) receiving a request at a remote access server from a remote access device, wherein:

said request calls for geographic information, said request calls for said remote access server to obtain data from a base device owned, operated and/or controlled by the individual, and said base device is operatively coupled for communication with said remote access server via a network;

(b) said remote access server obtaining said data from said base device; and (c) providing said geographic information called for in said request, based at least in part on said data.

33. An apparatus according to claim 32, wherein said geographic information is location data.

34. An apparatus according to claim 33, wherein said step (c) includes the step of:

(1) querying a mapping system for graphical data, wherein said query is based at least in part on said data obtained in said step (b).

35. An apparatus according to claim 34, wherein said data obtained in said step (b) identifies a geographic location and said graphical data includes a map showing said geographic location.

36. An apparatus according to claim 32, wherein said geographic information is direction data.

37. An apparatus according to claim 36, wherein said data obtained in said step (b) identifies at least a first location and said geographic information includes directions between said first location and a second location.

38. An apparatus according to claim 37, wherein said step (c) includes the step of:

(1) querying a mapping system for graphical data, based at least in part on said first location, wherein said graphical data includes a map showing directions between said first location and said second location.

39. An apparatus according to claim 38, wherein said step (c) includes the step of:

(2) mapping directions between said first location and said second location.

40. An apparatus according to claim 32, wherein said remote access server obtains said data from said base device in said step (b) via a secure link in said network.

41. An apparatus according to claim 32, wherein said remote access server obtains said data from said base device in said step (b) via at least one request initiated by said base device.

42. An apparatus according to claim 32, wherein said data includes information other than a geographic location of said base device.

* * * * *